United States Patent
Clinkenbeard

[15] 3,698,242
[45] Oct. 17, 1972

[54] ENDLESS POWER TRANSMISSION BELT TESTING MEANS

[72] Inventor: Donald E. Clinkenbeard, Springfield, Mo.

[73] Assignee: Dayco Corporation, Dayton, Ohio

[22] Filed: July 15, 1971

[21] Appl. No.: 162,889

[52] U.S. Cl. .......................... 73/94, 73/100, 73/103
[51] Int. Cl. .............................................. G01n 3/08
[58] Field of Search ........... 73/94, 100, 103, 89, 88 R

[56] References Cited

UNITED STATES PATENTS 1,749,297    3/1930    Norman ................... 73/100 X

*Primary Examiner*—James J. Gill
*Assistant Examiner*—Marvin Smollar
*Attorney*—Reuben Wolk

[57] ABSTRACT

An endless power transmission belt holding fixture and apparatus using the same is provided wherein the fixture has a pair of supports each having an inclined bearing surface and the bearing surfaces correspond in inclination to the inclination of the sides of a power transmission belt to be held in the fixture. The fixture has means guiding the supports for movement towards and away from each other and the belt is retained from moving out of the fixture in a direction transverse the inclined bearing surfaces whereupon the fixture enables a power transmission belt to be compressed in an edgewise manner to thereby determine the amount such belt is compressed upon applying a particular compressive force thereagainst.

14 Claims, 5 Drawing Figures

PATENTED OCT 17 1972 3,698,242
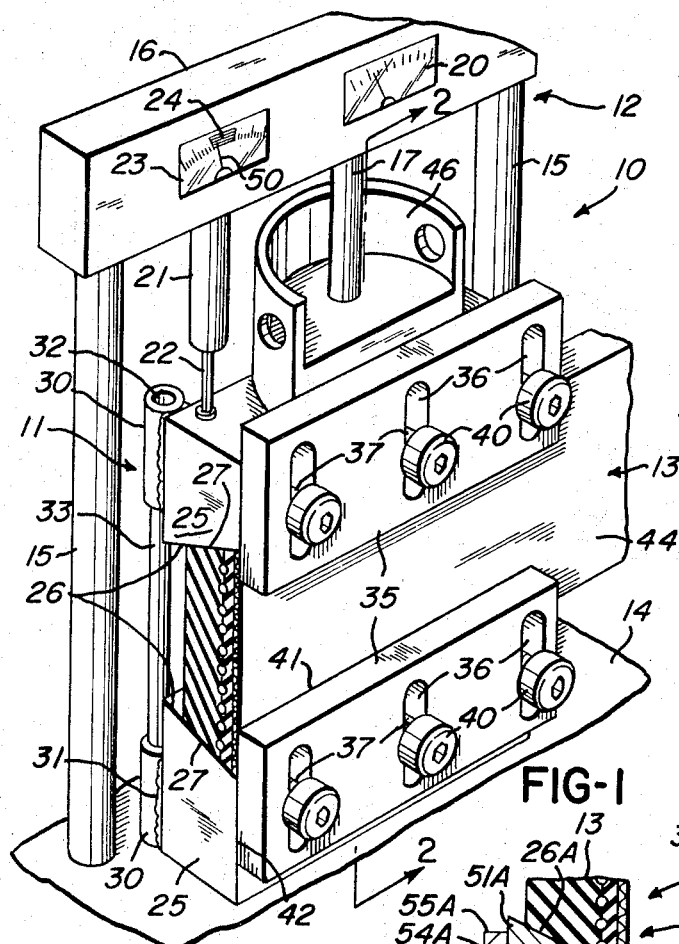
INVENTOR
DONALD E. CLINKENBEARD
BY
Reuben Wolk
ATTORNEY

ENDLESS POWER TRANSMISSION BELT TESTING MEANS

BACKGROUND OF THE INVENTION

In using endless power transmission belts and particularly those having a substantial transverse dimension or width and a trapezoidal cross-sectional outline, it has been found that there is a direct relationship between the crosswise rigidity of such a belt and its expected operating life. In addition, in providing endless belts of the character mentioned above for use with variable speed drives and where there is repeated application of a side force against one of the non-parallel sides of such a trapezoidal belt, for example, it has been found that belts having crosswise rigidity within a particular range will usually provide better performance than other belts which do not test within this range.

SUMMARY

This invention provides a simple and economical power transmission belt holding fixture and an apparatus using same wherein the fixture has a pair of supports each having an inclined bearing surface and the bearing surfaces correspond in inclination to the inclination of the sides of a power transmission belt to be held in the fixture. The fixture has means guiding the supports for movement toward and away from each other and means retaining the belt from moving out of the fixture in a direction transverse the inclined bearing surfaces whereupon the fixture enables a power transmission belt to be compressed in an edgewise manner to thereby determine the amount such belt is compressed upon applying a particular compressive force thereagainst.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which:

FIG. 1 is a perspective view of one exemplary embodiment of an endless power transmission belt holding fixture of this invention and also illustrating therewith portions of a machine which uses such fixture to test the transverse rigidity of a belt having a substantially trapezoidal cross-sectional outline;

FIG. 2 is a cross-sectional view taken on the line 2—2 of FIG. 1 illustrating the belt prior to the application of a compressive force thereagainst;

FIG. 3 is a view taken on the line 3—3 of FIG. 2;

FIG. 4 is a view similar to FIG. 2, illustrating the belt in a compressed condition due to a compressive force applied against the non-parallel sides of its trapezoidal outline; and FIG. 5 is a fragmentary view similar to the lower portion of FIG. 2 and particularly illustrating another embodiment of a fixture having a typical detachable member which may be utilized on both the upper and lower supports of the fixture.

DESCRIPTION OF ILLUSTRATED EMBODIMENTS

Reference is now made to FIG. 1 of the drawing which illustrates one exemplary embodiment of a belt testing apparatus of this invention which is designated generally by the reference numeral 10. The apparatus 10 comprises a belt holding fixture 11 and a device or machine 12 which is used to apply compressive forces or loads against a workpiece or test specimen which in this example is in the form of an endless power transmission belt 13 supported in the fixture 11 and the belt of this example has a substantially trapezoidal cross-sectional outline.

The machine 12 has a worktable 14 which supports the fixture 11 thereon and an upstanding structure 15 which supports a main body or housing 16. The housing 16 houses conventional force applying means in the form of a vertically extendible and retractable actuating piston or rod 17; and, a panel 20 is provided for indicating the amount of force exerted by the rod 17.

The machine 12 also has a measuring device or gage 21 of any known conventional construction for measuring the distance the belt 13 is compressed and the gage has an outwardly urged telescoping plunger 22 which is yieldingly urged in contact with an associated surface of the fixture 11 and the position of such plunger and, hence, the amount the belt 13 is compressed is indicated on a suitable measurement indicating panel or scale 23. The scale 23 may have an acceptable range, indicated by a plurality of closely spaced lines at 24 in FIG. 1, and if upon testing a particular belt 13 a movable indicator associated with scale 23 moves within range 24, it indicates the belt is acceptable.

As seen particularly in FIGS. 1 and 2, the fixture 11 comprises a pair of support blocks or supports 25 each having an inclined bearing surface 26 provided as an integral part thereof and the angle of inclination of each bearing surface 26 with respect to either a vertical or horizontal plane corresponds to the inclination of the nonparallel sides 27 of the endless trapezoidal belt 13, upon viewing such belt in cross-section.

The fixture 11 has means for guiding the supports 25 for substantially rectilinear vertical movements toward and away from each other and in this example such guiding means comprises a pair of tubular members or collars 30 fixed to the lower support 25 (as viewed in FIG. 1) in parallel spaced relation and a cooperating pair of tubular collars also designated by the reference numeral 30 fixed to the upper support 25. The collars 30 are fixed to their supports using any suitable technique and in this example each collar 30 is fixed to an associated support 25 by welds 31.

Each collar 30 has a substantially right circular cylindrical opening 32 provided therein and each collar 30 of one support 25 is aligned with an associated collar 30 of the other support 25 so that the cylindrical openings 32 therein are arranged in coaxially aligned relation. The fixture 11 also has a pair of elongated members in the form of elongated rods 33 comprising the guiding means and each rod has oppositely arranged or opposed right circular cylindrical end portions 34 each supported within a cylindrical opening 32 of an associated collar 30. The rods 33 guide the supports 25 for rectilinear movement toward and away from each other and with the fixture 11 supported in the manner illustrated in FIG. 1 the rods 33 guide the supports 25 for substantially rectilinear vertical movements while preventing movements in directions transverse the vertical.

The fixture 11 also has means retaining the belt 13 from moving out of the fixture 11 in a direction transverse the inclined bearing surfaces 26. The retaining means of this example comprises a pair of plates 35 each having elongated vertical openings 36 extending therethrough with each opening being adapted to receive a threaded bolt 37 having an enlarged head 40. Each plate 35 has an inside surface 41 which is held clamped against a vertical planar surface 42 of its associated support 35 upon inserting each bolt 37 through its elongated opening 36 and threading such bolt within an associated threaded opening 43 in the support 25.

The elongated openings 36 allow the retaining means or plates 35 to be moved toward and away from each other and firmly clamped into position so that the surfaces of such plates engaging what is customarily the top outside surface 44 of the belt 13 may be varied. In this example, each plate 35 is positioned so that a substantially rectangular strip of its inside surface 41 having a height indicated at 45 will engage top surface 44.

It is a simple matter to test a particular endless power transmission belt, such as the belt 13 of trapezoidal outline using the apparatus 10. In particular, the belt 13 is placed in fixture 11 in an edgewise manner so that the nonparallel sides 27 thereof are engaged by inclined surfaces 26 of the supports 25 and the fixture 11 is supported on the worktable 14 of machine 12. The machine 12 is then energized causing its telescoping piston 17 to be urged against a piston receiving collar 46 fixed to the top support 25. The amount of force applied by the piston 17 is a known predetermined force and may be read on the readout panel 20. If the belt 13 meets the required design criteria it will be compressed or squashed such that it will bulge on opposite sides thereof as indicated at 49 in FIG. 4.

The amount that the belt 13 is compressed vertically may be read on the scale 23 and for each belt tested which meets particular design and performance criteria an indicator 50 associated with the gage 21 will read within the range 24 of scale 23. If the indicator 50 is on either side of range 24 the belt is rejected. Further, with this apparatus and fixture for testing belt 13 the test is accomplished without damage to the belt whereby 100 percent testing may be achieved, if desired, and the acceptable previously tested belts shipped to an ultimate user.

The sides of belts such as belt 13 tested in fixture 11 and apparatus 10 may have different angles of inclination for their non-parallel sides 27 whereby it may be desired to provide a fixture capable of being modified or adjusted. For this purpose another embodiment of the fixture of this invention may be provided as illustrated in the fragmentary view of FIG. 5. The fixture illustrated in FIG. 5 is very similar to the fixture 11 (although only a fragmentary portion of such fixture is illustrated for convenience); therefore, such fixture will be designated by the reference 10A and parts of the fixture 10A which are very similar to corresponding parts of fixture 10 will be designated by the same reference numeral as in fixture 10 also followed by the letter designation A and not described again. Only those component parts of the fixture 10A which are different from corresponding parts of the fixture 10 will be designated by a new reference numeral also followed by the designation A and described in detail.

The main difference between the fixture 11A and fixture 11 is that the fixture 11A has a readily detachable wedge-shaped member 51A which may be detached and removed from its associated support 25A. The member 51A may have an inclined bearing surface 26A which corresponds to the angle of inclination for a side of a particular belt 13 to be tested. Thus, rather than replacing the entire support 25A with its inclined bearing surface, it is merely necessary to install a new member 51A which has a corresponding angle of inclination for its bearing surface 26A which corresponds to the angle of inclination of the associated side of a belt to be tested in fixture 11A.

Each member 51A is held in position on its support 25A by one or more fasteners in the form of threaded bolts 53A. Each bolt 53A extends through an opening 54A provided in an upward extension 55A of an associated support 25A and the threaded end of bolt is threadedly received within an associated cooperating threaded opening 56A of its member 51A.

For ease of presentation, portions of the testing apparatus or machine 12 have been illustrated in FIG. 1 of this disclosure in perspective and with certain components thereof drawn to a reduced scale. A machine such as the machine 12 is readily available on the market as a standard item and has various components comprising means for applying controlled forces or loads against a force applying device such as a telescoping piston 17, a force readout panel 20, and a gaging device 21 together with a measurement indicating panel 23. A typical machine serving the above functions and useable with fixture 11 is sold by Instron Engineering Corporation, 2505 Washington St., Canton, Mass.

While present exemplary embodiments of this invention, and methods of practicing the same, have been illustrated and described, it will be recognized that this invention may be otherwise variously embodied and practiced within the scope of the following claims.

What is claimed is:

1. A power transmission belt holding fixture comprising, a pair of supports each having an inclined bearing surface with the bearing surfaces corresponding in inclination to the inclination of the sides of a power transmission belt to be held in said fixture, means guiding said supports for movement toward and away from each other, means retaining said belt from moving out of said fixture in a direction transverse to said inclined bearing surfaces, and means for applying a load against said belt, said fixture enabling said power transmission belt to be compressed in an edgewise manner to thereby determine the amount said belt is compressed upon applying said load thereagainst.

2. A fixture as set forth in claim 1 in which said guiding means comprises a collar fixed to one of said supports and a cooperating collar fixed to the other of said supports, said collars having cylindrical openings therein arranged in aligned relation, and an elongated member having opposed end portions supported within said cylindrical openings, said elongated member guiding said supports for rectilinear movement toward and away from each other.

3. A fixture as set forth in claim 2 in which said elongated member comprises a cylindrical rod.

4. A fixture as set forth in claim 1 in which said retaining means comprises a plate detachably fastened to each of said supports.

5. A fixture as set forth in claim 1 in which each of said supports has a readily detachable member provided with its inclined bearing surface as an integral part thereof, said members enabling providing inclined bearing surfaces for said fixture having different angles of inclination.

6. A fixture as set forth in claim 5 in which each of said members is a wedge-shaped member and further comprising means detachably fastening each wedge-shaped member to its support.

7. A fixture as set forth in claim 1 in which said guiding means comprises a pair of tubular collars fixed to one of said supports in parallel spaced relation and a pair of tubular collars fixed in parallel spaced relation to the other of said supports, each of said tubular collars having a right circular cylindrical opening therein and being arranged on its support in aligned relation with an associated tubular collar on the other support, and a pair of elongated right circular cylindrical rods each having opposed end portions slidably supported within cylindrical openings of an aligned pair of collars, said rods guiding said supports for rectilinear movement toward and away from each other.

8. A fixture as set forth in claim 7 in which said inclined bearing surfaces are uninterrupted planar surfaces which are particularly adapted to engage and hold a belt having a trapezoidal cross-sectional configuration.

9. An endless power transmission belt testing apparatus comprising; a fixture for holding a power transmission belt having a pair of supports each having an inclined bearing surface which corresponds in inclination to the inclination of the sides of a power transmission belt to be held in said fixture, means guiding said supports for movement toward and away from each other, and means retaining said belt from moving out of said fixture in a direction transverse to said inclined bearing surfaces; and a machine operatively associating with said fixture having means for applying a known load against said belt by urging said supports toward each other with said belt sandwiched between said inclined surfaces and a device for measuring the distance said belt is compressed by the load applied thereagainst by said load applying means.

10. An apparatus as set forth in claim 9 in which said machine also has means indicating the magnitude of said load.

11. An apparatus as set forth in claim 9 in which said retaining means comprises a plate detachably fastened to each of said supports.

12. An apparatus as set forth in claim 9 in which each of said supports has a readily detachable member provided with its inclined bearing surface as an integral part thereof, said members enabling providing inclined bearing surfaces having different angles of inclination for said fixture.

13. An apparatus as set forth in claim 12 in which each of said members is a wedge-shaped member and further comprising means detachably fastening each wedge-shaped member to its support.

14. An apparatus as set forth in claim 9 in which said guiding means comprises a pair of tubular collars fixed to one of said supports in parallel spaced relation and a pair of tubular collars fixed in parallel spaced relation to the other of said supports, each of said tubular collars having a right circular cylindrical opening therein and being arranged on its support in aligned relation with an associated tubular collar on the other support, and a pair of elongated right circular cylindrical rods each having opposed end portions slidably supported within cylindrical openings of an aligned pair of collars, said rods guiding said supports for rectilinear movement toward and away from each other.

* * * * *